(No Model.)

A. H. WINN.
DENTAL DRILL.

No. 381,196. Patented Apr. 17, 1888.

Witnesses.
J. K. Parks
W. A. Reed

Inventor.
Adelbert H. Winn.
By his Attorney
Luther V. Moulton.

UNITED STATES PATENT OFFICE.

ADELBERT H. WINN, OF NASHVILLE, MICHIGAN.

DENTAL DRILL.

SPECIFICATION forming part of Letters Patent No. 381,196, dated April 17, 1888.

Application filed October 21, 1887. Serial No. 253,032. (No model.)

*To all whom it may concern:*

Be it known that I, ADELBERT H. WINN, a citizen of the United States, residing at Nashville, in the county of Barry and State of Michigan, have invented certain new and useful Improvements in Dental Drills; and I do hereby declare the following to be a full, clear, and exact description of the invention, such as will enable others skilled in the art to which it appertains to make and use the same.

My invention relates to improvements in that class of dental drills which are guided by the hand of the operator and rotated by some other suitable mechanism operating to turn a shaft or spindle to which said drill is attached.

The objects of my invention are to provide means whereby the axis of the drill may be adjusted relative to the work without materially altering or changing the position of the axis of that portion of the shaft within the hand of the operator, and for that purpose to provide a suitable joint and connecting gearing near the drill, whereby said drill may be adjusted and rotated, that shall be compact, adjustable at any desired angle, easy of operation, and durable. I am aware that similar results have been attempted by gears having rectangular interlocking parts, and an adjustable joint held at certain intervals by a latch engaging with notches. Such gears do not operate well and such joint is adjustable at intervals only, and such latch is too bulky when attached to a dental drill. I accomplish these results by the mechanism illustrated in the accompanying drawings, in which—

Figure 1:
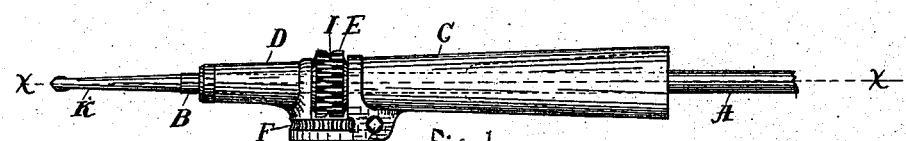
Figure 2:
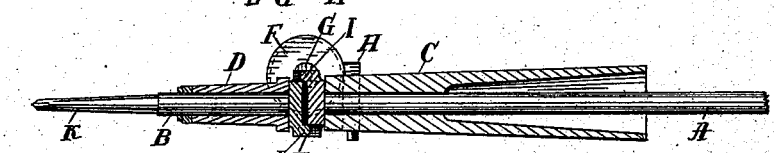
Figure 3:
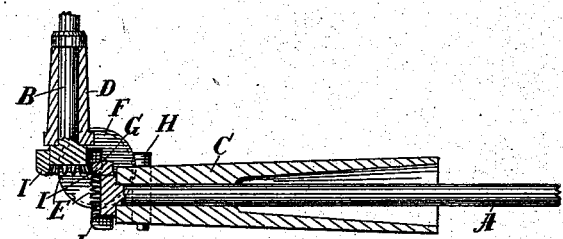

Figure 1 is an elevation of a device embodying my invention; Fig. 2, a horizontal section of the same on the line $x$ $x$ of Fig. 1; Fig. 3, the same with the axis of the drill adjusted at right angles to that of the driving-shaft, and Fig. 4 the same with the drill reversed and its axis parallel to that of the driving-shaft.

Like letters refer to like parts in all the figures.

A is the driving-shaft and B the adjustable shaft, respectively journaled in the bearings C and D, which latter at their adjacent ends are attached to each other by a hinge-joint, consisting of circular plates F and L, attached to the respective ends of said bearings, and connected by a suitable rivet, G, the axis of which is tangent to the pitch-line of the gears E at the point where said lines cross when the said gears are adjusted to operate as bevel-gears. Said gears are attached to the adjacent ends of the shafts A and B, and serve to impart motion from one shaft to the other when adjusted in the various positions as hereinafter described.

The plate F has a worm-gear in its periphery, with which the screw H engages to rotate the said plate and parts supported thereby about the axis of the rivet G. Said screw also serves to hold the parts in any given position when adjusted, and may be turned by any convenient key applied to the squared end of the same. I am thus enabled to effect adjustment at any angle whatever instead of at intervals, and the device is more compact and occupies less room in the mouth.

K represents a drill or other tool attached to the shaft B and adapted to operate by rotation upon its axis.

Figure 4:
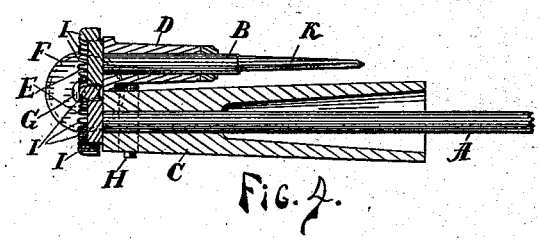

The gears E are primarily of the spur-gear form. The difference consists in that the teeth are extended beyond the adjacent sides of the wheels, as shown at I, so that when the axes of the shafts A and B coincide said extensions I will interlock and the gears will operate as a coupling. As the axis of the hinge-joint referred to passes through the point of contact of these extensions, they will at all times interlock at that point regardless of the relative direction of the axes of the shafts A and B, the result being that motion is imparted from one shaft to the other in all the various adjustments of the shafts within the ninety degrees included between the positions, as shown in Figs. 1 and 4, respectively.

The extended portions I of the gear-teeth are semicircular in shape, the center of said semi-circle being at the point where the pitch-lines of the gears cross when operating as bevel-gears. By virtue of such form they engage with each other the same and to like extent in all positions, run smoothly, and are more durable.

The operation of my device is obvious and needs no further description.

What I claim, and wish to secure by Letters Patent, is as follows:

In a dental drill, a driving-shaft and a shaft having the tool attached, in combination with bearings connected by a hinge-joint and adjusted by a worm gear and screw, and gears having semicircular interlocking teeth, substantially as described.

In testimony whereof I affix my signature in presence of two witnesses.

ADELBERT H. WINN.

Witnesses:
  WALTER WEBSTER,
  JAMES B. MILLS.